(12) United States Patent
Johnson

(10) Patent No.: US 7,096,391 B2
(45) Date of Patent: Aug. 22, 2006

(54) ERROR MESSAGE SUPPRESSION SYSTEM AND METHOD

(75) Inventor: Ted C. Johnson, Issaquah, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 10/425,439

(22) Filed: Apr. 29, 2003

(65) Prior Publication Data

US 2004/0221204 A1 Nov. 4, 2004

(51) Int. Cl.
*G06F 11/10* (2006.01)

(52) U.S. Cl. .................. 714/48; 714/47; 719/318; 370/231

(58) Field of Classification Search .............. 370/231
See application file for complete search history.

(56) References Cited

U.S. PATENT DOCUMENTS

| | | | | |
|---|---|---|---|---|
| 4,745,593 | A * | 5/1988 | Stewart | 370/244 |
| 5,226,150 | A * | 7/1993 | Callander et al. | 714/57 |
| 5,307,176 | A * | 4/1994 | Dweck et al. | 358/403 |
| 5,388,189 | A * | 2/1995 | Kung | 706/45 |
| 5,619,656 | A * | 4/1997 | Graf | 709/224 |
| 5,872,912 | A * | 2/1999 | Brownmiller et al. | 714/47 |
| 6,067,444 | A * | 5/2000 | Cannon et al. | 340/7.44 |
| 6,154,147 | A * | 11/2000 | Gabrielle et al. | 340/7.52 |
| 6,366,926 | B1 * | 4/2002 | Pohlmann et al. | 707/104.1 |
| 6,385,665 | B1 * | 5/2002 | Canady et al. | 710/2 |
| 6,405,035 | B1 * | 6/2002 | Singh | 455/414.1 |
| 6,470,398 | B1 * | 10/2002 | Zargham et al. | 719/318 |
| 6,631,398 | B1 * | 10/2003 | Klein | 709/206 |
| 6,684,265 | B1 * | 1/2004 | Graf | 710/18 |
| 6,701,346 | B1 * | 3/2004 | Klein | 709/206 |
| 6,775,658 | B1 * | 8/2004 | Zothner | 706/47 |
| 6,990,331 | B1 * | 1/2006 | Akao et al. | 455/412.1 |
| 2004/0139447 | A1 * | 7/2004 | Hope et al. | 719/318 |

FOREIGN PATENT DOCUMENTS

EP 89831 A2 * 9/1983
JP 09319452 A * 12/1997

OTHER PUBLICATIONS

J. H. Saltzer, D. P. Reed, D. D. Clark, End-to-end arguments in system design, ACM Transactions on Computer Systems (TOCS), v.2 n.4, p. 277-288, Nov. 1984.*
H. Kawamichi et al., "A Notification-suppression. Method using Cooperative Software agents", pp. 319-323. SICE. 2003, Aug. 2003.*

* cited by examiner

*Primary Examiner*—Bryce P. Bonzo
*Assistant Examiner*—Jack W. Szeto

(57) ABSTRACT

The disclosed embodiments relate to a system and method for message suppression. The system comprises a memory that is adapted to store a data element corresponding to a failure notification and to store a corresponding timestamp. Also included in the system is an interface adapted to receive the failure notification, create the corresponding timestamp, store the data element and the timestamp corresponding to the failure notification in the memory, send a message corresponding to the failure notification, suppress the sending of subsequent messages corresponding to the failure notification until a predetermined condition occurs, receive a notification to cancel the suppression of subsequent messages corresponding to the failure notification, and send subsequent messages corresponding to the failure notification in response to failure notifications received after the notification to cancel the suppression of subsequent messages.

27 Claims, 4 Drawing Sheets

ERROR MESSAGE SUPPRESSION SYSTEM AND METHOD

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing a gigahertz (one billion operations per second) and continuing well beyond.

Productivity has also increased tremendously because of the explosion in the development of software applications. In the early days of the PC, people who could write their own programs were practically the only ones who could make productive use of their computers. Today, there are thousands and thousands of software applications ranging from games to word processors and from voice recognition to web browsers.

The Evolution of Networked Computing

In addition to improvements in PC hardware and software, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share Internet connections, which may result in significant cost savings. Networked computing has revolutionized the way in which business is conducted across the world.

Not surprisingly, the evolution of networked computing has presented technologists with some challenging obstacles along the way. One obstacle of connecting computers that use different operating systems ("OSes") is making them communicate efficiently with each other over a network. Each different OS (or even variations of the same OS) has its own idiosyncrasies of operation and configuration. The interconnection of computers running different OSes presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server that may provide a shared printer and/or a shared Internet connection. On the other end of the spectrum, a global company's network environment may require interconnection of hundreds or even thousands of computers across large buildings, a campus environment, or even between groups of computers in different cities and countries. Such a configuration would typically include a large number of servers, each connected to numerous client computers.

Further, the arrangements of servers and clients in a larger network environment could be connected in any of a large number of topologies that may include local area networks ("LANs"), wide area networks ("WANs") and metropolitan area networks ("MANs"). In these larger networks, a problem with a server (a failed hard drive, corrupted system software, failed network interface card or OS lock-up, for example) has the potential to interrupt the operation of a large number of workers who depend on network resources to complete certain tasks efficiently. Needless to say, companies devote considerable time and effort to keep their networks operating to maximize productivity.

To keep computer systems operating and to resolve network problems as fast as possible, many computer systems may include automatic failure detection and correction hardware and/or software. If a problem, such as a hard drive failure, occurs, a message may be automatically sent to a member of the network support team. These automated messages may include messages to a telephone or pager. Automated failure messages may also be sent to network personnel via email. If a computing resource that is used by a large number of client systems experiences a problem, many duplicate messages to the network support team may be generated. These redundant messages may take up computer network resources, while providing little or no tangible benefit.

SUMMARY OF THE INVENTION

The disclosed embodiments relate to a system and method for message suppression. The system comprises a memory that is adapted to store a data element corresponding to a failure notification and to store a corresponding timestamp. Also included in the system is an interface adapted to receive the failure notification, create the corresponding timestamp, store the data element and the timestamp corresponding to the failure notification in the memory, send a message corresponding to the failure notification, suppress the sending of subsequent messages corresponding to the failure notification until a predetermined condition occurs, receive a notification to cancel the suppression of subsequent messages corresponding to the failure notification, and send subsequent messages corresponding to the failure notification in response to failure notifications received after the notification to cancel the suppression of subsequent messages.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
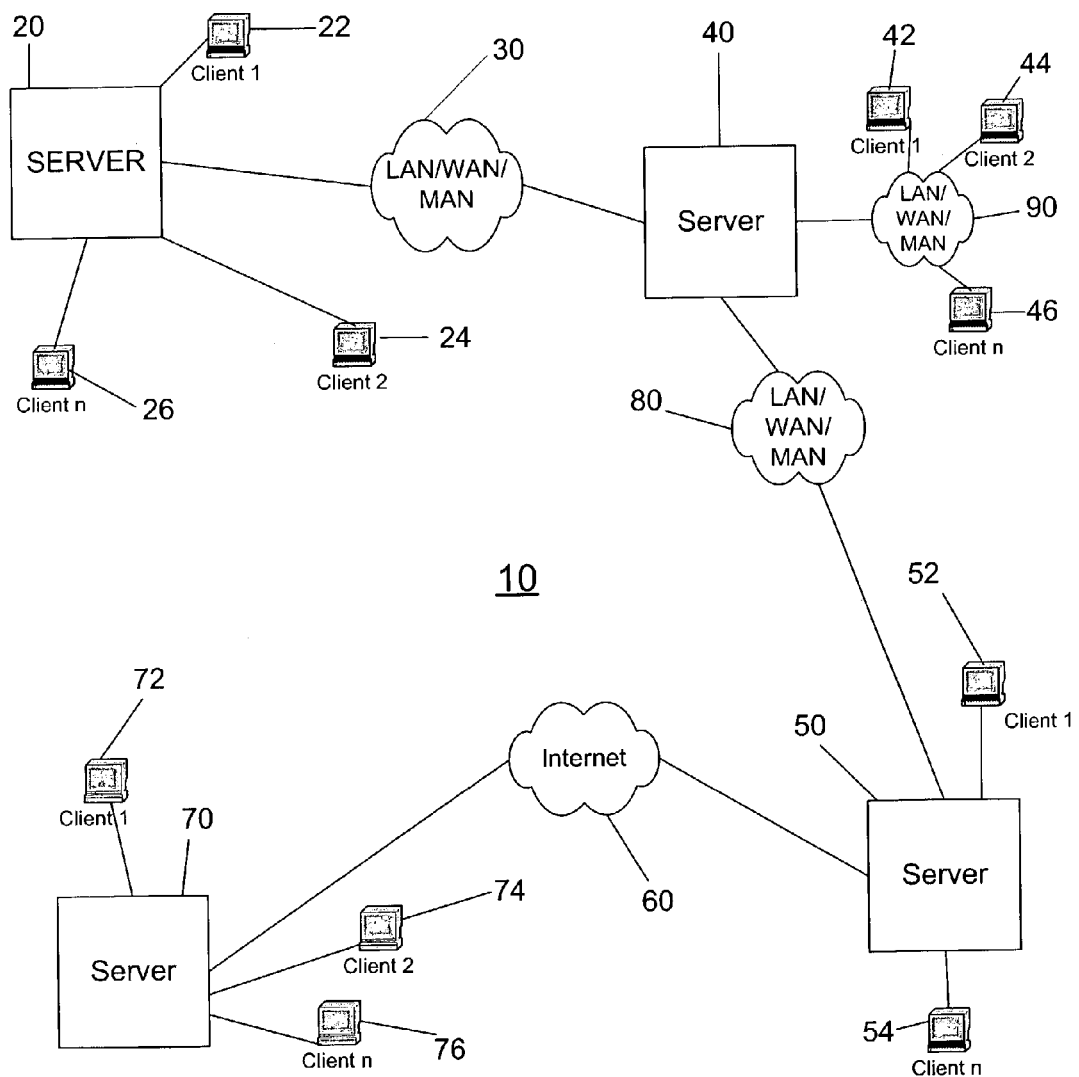
FIG. 1 is a block diagram illustrating a computer network in accordance with an embodiment of the present invention.

Turning now to the drawings and referring initially to FIG. 1, a block diagram of a computer network architecture is illustrated and designated using a reference numeral 10. A server 20 may be connected to a plurality of client computers 22, 24 and 26. The server 20 may be connected to as many as "n" different client computers. Each client computer in the network 10 may be a functional client computer. The magnitude of "n" may be a function of the computing power of the server 20. If the server 20 has large computing power (for example, faster processor(s) and/or more system memory), it may be able to effectively serve a number of client computers.

The server 20 may be connected via a network infrastructure 30, which may include any combination of hubs, switches, routers, and the like. While the network infrastructure 30 is illustrated as being either a local area network ("LAN"), storage area network ("SAN") a wide area network ("WAN") or a metropolitan area network ("MAN"), those skilled in the art will appreciate that the network infrastructure 30 may assume other forms or may even provide network connectivity through the Internet. As described below, the network 10 may include other servers, which may be dispersed geographically with respect to each other to support client computers in other locations.

The network infrastructure 30 may connect the server 20 to server 40, which may be representative of any other server in the network environment of server 20. The server 40 may be connected to a plurality of client computers 42, 44, and 46. As illustrated in FIG. 1, a network infrastructure 90, which may include a LAN, a WAN, a MAN, WiFi or other network configuration, may be used to connect the client computers 42, 44 and 46 to the server 40. The server 40 may additionally be connected to server 50, which may be connected to client computers 52 and 54. A network infrastructure 80, which may include a LAN, a WAN, a MAN or other network configuration, which may be used to connect the client computers 52, 54 to the server 50. The number of client computers connected to the servers 40 and 50 may depend on the computing power of the servers 40 and 50, respectively.

The server 50 may additionally be connected to the Internet 60, which may be connected to a server 70. The server 70 may be connected to a plurality of client computers 72, 74 and 76. The server 70 may be connected to as many client computers as its computing power may allow.

Those of ordinary skill in the art will appreciate that the servers 20, 40, 50, and 70 may not be centrally located. A network architecture, such as the network architecture 10, may typically result in a wide geographic distribution of computing resources that may be maintained. The servers 20, 40, 50, and 70 may be maintained separately. Also, the client computers illustrated in the network 10 may be subject to maintenance because each may be a functional computer that stores software and configuration settings on a hard drive or elsewhere in memory.

Because of the complexity of the computer network 10, a wide array of problems may occur. For example, a hard drive or other storage device in the server 40 may cause an error to be generated to any of the clients in the network environment that may be using a file or resource on the malfunctioning hard drive. As another example, the server 40 may have a hard drive that stores a customer database that is accessible to the client computers in the network 10. If the hard drive that stores the customer database experiences a malfunction, an error message may be generated to all the clients that are accessing or trying to access the database. As another example, the server 20 may be a WWW web server and client 1, client 2 through client N may be web browser clients. The web server 20 may have CGI-BIN code which accesses the database server 40 on behalf of requests from web server clients. If the database server 40 is down, then the web server 20 may generate an error message to support personnel each time a web browser client access as a web page that requests access to the database server 40. This can generate hundreds of redundant error messages in a short period of time.

In systems that employ automatic failure detection, a separate failure message may be dispatched to network support personnel for each attempted access of the database. These messages may be in the form of an automated telephone call to a phone center or pager. Automated messages may additionally be sent to IT support personnel by email or cell phone. Automated messages may be generated by a application program interface ("API") in response to error messages generated by failed computing resources. After the first automated message has been sent, subsequent messages may simply consume additional computing and/or human resources without significant positive effect. Presumably, IT support personnel may respond to the initial message indicating failure of a computing resource within the network, so the subsequent messages provide little, if any, additional information useful for correcting the errors.

Figure 2:
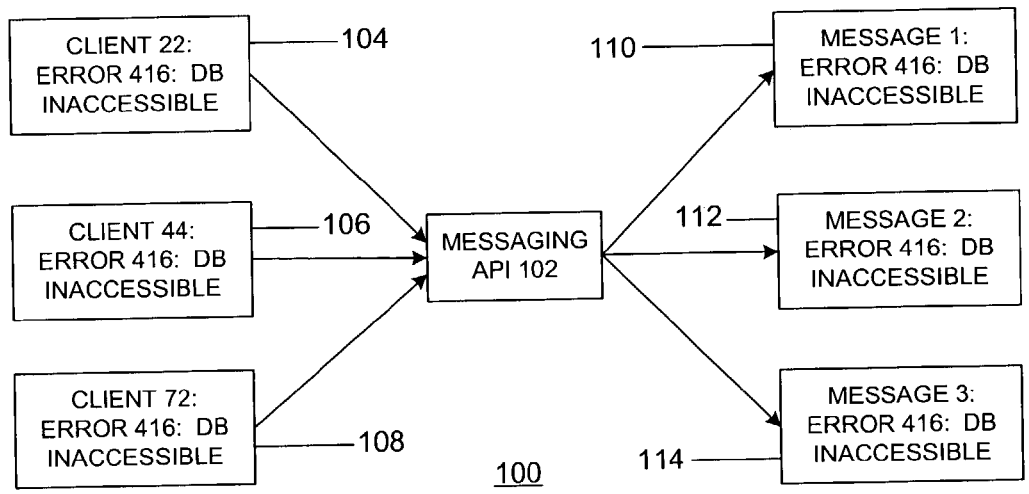
FIG. 2 is a block diagram illustrating the distribution of error messages in a computer network without the capability of canceling or revoking message suppression.

A potential problem with excess message generation is illustrated in FIG. 2, which is a block diagram illustrating the distribution of error messages in a computer network without the capability of canceling or revoking message suppression. The diagram shown in FIG. 2 is generally referred to by the reference numeral 100. An application program interface ("API") 102 may be adapted to receive error notifications from system resources disposed within a computer network such as the computer network 10 of FIG. 1. The API 202 may reside on a server that produces a high volume of IT support error messages, such as a web server 20.

When a system resource, such as a hard drive or other storage device, fails, users who are using or attempting to use a resource, such as a database ("DB"), may be unable to access the desired resource. Error notifications may be generated and passed to the API 102 in the event of a failure. For example, a failure notification 104 may be passed to the API 102 from a client computer, such as the client computer 22 (FIG. 1), if the client computer 22 was accessing or attempting to access the database stored on the storage device. Other failure notifications, such as the failure notifications 106 and 108, may be generated by other client computers, such as the client computers 44 and 72 (FIG. 1), if the client computers were accessing or attempting to access the failed database at the time of resource failure.

In response to the failure notifications, the API 102 may issue messages to IT support personnel to alert them to the failure of the storage device. Without message suppression, the API 102 will generate a separate message for each of the failure notifications 104, 106 and 108. For example, a first message 110 corresponding to the failure notification 104 will be generated and sent to IT support personnel in the form of an email message, a telephone page, or the like. Likewise, a second message 112 will correspond to the failure notification 106, and a third message 114 will correspond to the failure notification 108. The messages 112 and 114 may be generated and sent to IT support personnel. In a computer network, a single failure of a system resource may generate tens or even hundreds of duplicate messages to IT support personnel. If duplicate messages are suppressed in the system 100, it may be difficult to cancel or revoke the message suppression after a problem or potential problem is resolved. If a problem is resolved rapidly and message suppression cannot be cancelled or revoked, a problem that recurs will not be detected until the message suppression time period has expired or some other condition to override message suppression occurs.

Figure 3:
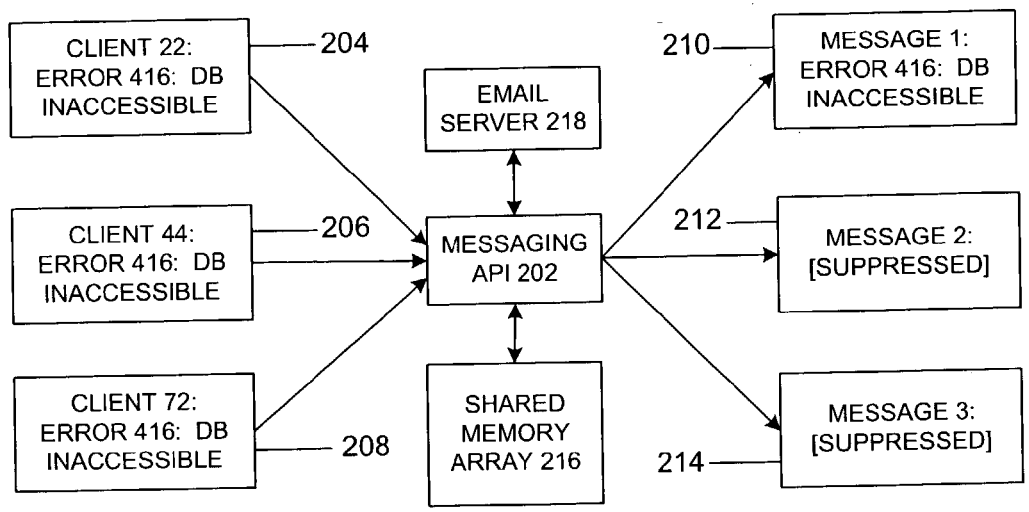
FIG. 3 is a block diagram illustrating the distribution of error messages in a computer network with cancelable or revocable message suppression in accordance with an embodiment of the present invention.

FIG. 3 is a block diagram illustrating the distribution of error messages in a computer network with cancelable or revocable message suppression in accordance with an embodiment of the present invention. The diagram shown in FIG. 3 is generally referred to by the reference numeral 200. An application program interface ("API") 202 is adapted to receive error notifications from system resources disposed within a computer network such as the computer network 10 of FIG. 1. As will be shown, the API 202 is additionally adapted to suppress duplicate failure messages (for example, messages reporting the same error condition) to IT support personnel.

If a system resource such as the storage device containing a database fails in the system 200, failure notifications 204, 206 and 208 will be generated by different clients as described above with respect to FIG. 2. The failure notifications 204, 206 and 208 will be passed to the API 202 for subsequent handling. In response to the failure notifications, the API 102 will issue a first failure message 210 to IT support personnel to alert them to the failure of the storage device. The API 202 has been adapted to suppress subsequent error messages 212 and 214, which correspond to duplicate error messages reporting the same problem or potential problem. The functionality of the API 202 is facilitated by the use of a shared memory array 216.

The array 216 may be located in the shared memory RAM of a computer system. For example, the array 216 may be implemented in the shared memory of one of the servers 20, 40, 50 or 70 shown in FIG. 1. Shared memory functionality is supported in all modern operating systems such as SunOS, Windows XP, HP-UX, and Linux. Concurrent client access to the array 216 is implemented with a semaphore. Semaphore functionality is available in all modern operating systems such as SunOS, Windows XP, HP-UX, and Linux.

The use of shared memory to store the array 216 allows the array 216 to exist independent of client processes. Normal (not shared) RAM usage is associated with client programs, and thus when the associated client program terminates, the contents of the associated RAM is lost. Shared memory is more stable because RAM that is associated with shared memory does not terminate when a client process terminates.

Each element of the array 216 may contain two integer fields: a message or a message abstract (for example, a checksum or a message digest) and a timestamp corresponding to each of the failure notifications 204, 206 and 208. A new array entry comprising a failure notification checksum and a corresponding timestamp may be added to the array whenever a new failure notification is received by the API 202. The abstract of the failure notifications may be in the form of a checksum or a message digest, which is much smaller and faster to search than a complete text version of the failure notification. The use of a failure message abstract instead of full text failure notifications results in a relatively compact array 216. New message abstracts may be added to the array 216 if they are unique with respect to other message abstracts currently stored in the array 216.

The timestamp associated with the abstracts of each of the failure notifications 204, 206, and 208 corresponds to a time at which the corresponding failure notification was generated. The API 202 examines the timestamp associated with each of the stored failure notification abstracts to suppress subsequent duplicate error messages for a predetermined time. For example, the API 202 may be programmed to issue a single message (for example, the message 210) corresponding to a specific failure notification and then to suppress subsequent duplicate messages (for example, the messages 212, 214) corresponding to the same failure notification for a period of one hour. Those of ordinary skill in the art will appreciate that failure notifications may be suppressed until the occurrence of some condition other than the passage of time. For example, duplicate messages could be suppressed indefinitely until receipt of a notification by IT support, for example. Alternatively, failed devices could be polled to determine if problems or potential problems had been resolved and duplicate messages could be suppressed until the polling indicates resolution of the problem or potential problem.

The data fields of the array 216 may have a predetermined length or size. For example, the failure notification abstract and the timestamp fields may be defined to be 32-bit integer fields. When the array 216 is initially created, may be initialized with bogus values. For example, the array field that is intended to store checksums corresponding to failure notification abstracts may be initialized with negative one, which does not correspond to a valid checksum value. Similarly, the array field that is intended to store timestamps associated with the failure notification abstracts may be initialized with negative one, which does not correspond to a valid time value. The failure notification abstract field is intended to have a checksum corresponding to specific failure notification stored therein. The timestamp field is intended to store a time value such as the number of seconds since Jan. 1, 1970 (GMT). As failure notifications (such as the failure notifications 204, 206 and 208) are generated, the bogus initial values stored in the array 216 are replaced with valid data.

The API 202 may also be adapted to allow a user (such as a member of the network maintenance team) to cancel or ignore duplicate message suppression after a problem or potential problem is resolved. For example, a specific problem may be repaired in less than the predetermined message suppression time period. One or more embodiments may allow a network maintenance team member to cancel or ignore the time period associated with the suppression of messages (via email, for example) so that a subsequent failure of the same network resource may be detected without waiting for the expiration of the originally programmed suppression time period.

The API 202 may be connected to receive and process emails from an email server 218. As explained below with reference to FIG. 5, the email processing capability of the API 202 may be used to allow network support personnel to cancel or ignore the message suppression time period after a network problem is repaired. The email server 218 may be one of the servers 20, 40, 50, 70 of the computer network 10 (FIG. 1). Alternatively, the message API 202 and shared memory array 216 may reside on a server which produces a high volume of IT support error messages, such as a web server 20.

Figure 4:
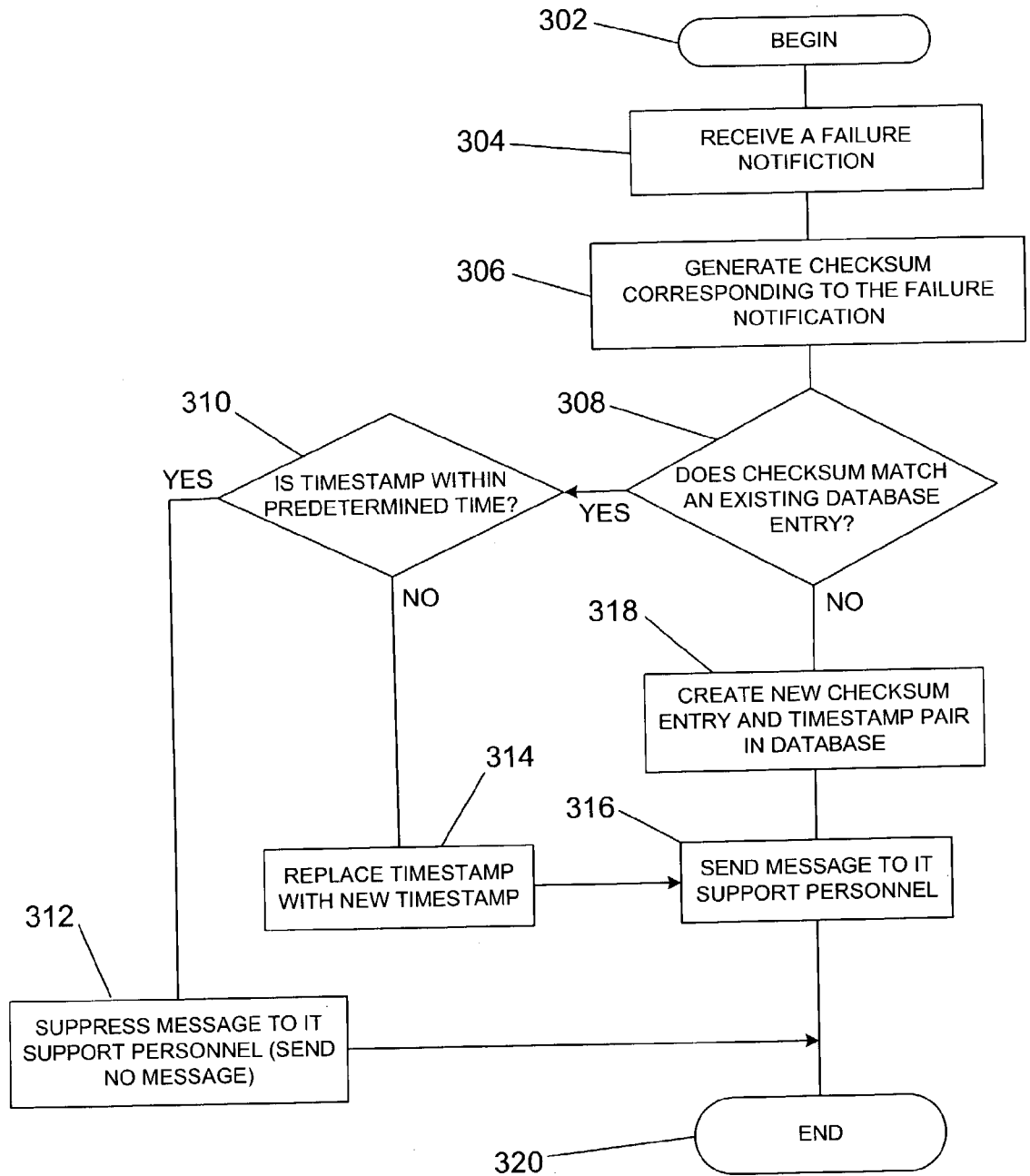
FIG. 4 is a process flow diagram that is useful in explaining the operation of an embodiment of the present invention.

FIG. 4 is a process flow diagram that is useful in explaining the operation of an embodiment. The process is generally referred to by the reference numeral 300. At block 302, the process begins. At block 304, a failure notification is received by the API 202. At block 306, the API may generate a checksum or message digest, as set forth above. The resulting checksum is compared to the other checksums stored in the shared memory array 216, as shown at block 308, to determine whether the checksum corresponds to an entry already stored in the array 216. If the checksum of the received failure notification matches an entry already stored in the array 216, then the timestamp corresponding to the failure notification checksum that is already stored in the array 216 is checked, as shown at block 310.

If the timestamp that corresponds to the existing array entry indicates that the entry that is already stored in the array occurred within a predetermined time period of the received failure notification (for example, one hour), then no message will be generated to IT support personnel (block 312). In other words, the duplicate message will be suppressed. On the other hand, if the timestamp corresponding to the existing array entry indicates that the stored entry is older than the predetermined time, the timestamp corresponding to the array entry will be replaced with a new timestamp indicative of the current time (block 314). A message alerting IT support personnel (such as the message 210 (FIG. 3)) will then be generated and sent, as shown at block 316).

If, as a result of the checksum comparison shown at block 308, no array entry corresponds to the received checksum, then the checksum entry and current timestamp will be stored as a new entry in the array 216, as shown at block 318. A message alerting IT support personnel is then generated and sent, as shown at block 316. At block 320, the process ends.

If a new entry must be made in the array 216 to accommodate a new checksum-timestamp pair, the API 202 will store the new checksum and timestamp in array fields that still contain the initial invalid data that was created when the array 216 was first initialized. In this manner, no valid data in the array 216 will be overwritten. If the array 216 is expandable and no additional fields are available, then a new entry for the new checksum and timestamp may be created. In this case, a garbage collection algorithm may be implemented to prevent the array from expanding indefinitely. If, in the more common case, the array 216 is of a fixed size, the API 202 will then overwrite the oldest entry in the array 216 with the new checksum and timestamp pair.

As set forth above, it may be beneficial to allow the time for which messages to IT support personnel are suppressed to be cancelled or ignored. With message suppression that may be cancelled or ignored upon request, an initial problem may be fixed after the receipt of a message from the API 202 but before expiration of the predetermined message suppression time period. The message suppression period may then be cancelled or ignored. Subsequent failure of the same system resource may then be immediately conveyed to the network support personnel because the subsequent failure notifications are not suppressed by the API 202. If the message suppression time period is not cancelled, subsequent failure messages may continue to be suppressed by the API 202 until the expiration of the initial message suppression period.

Figure 5:
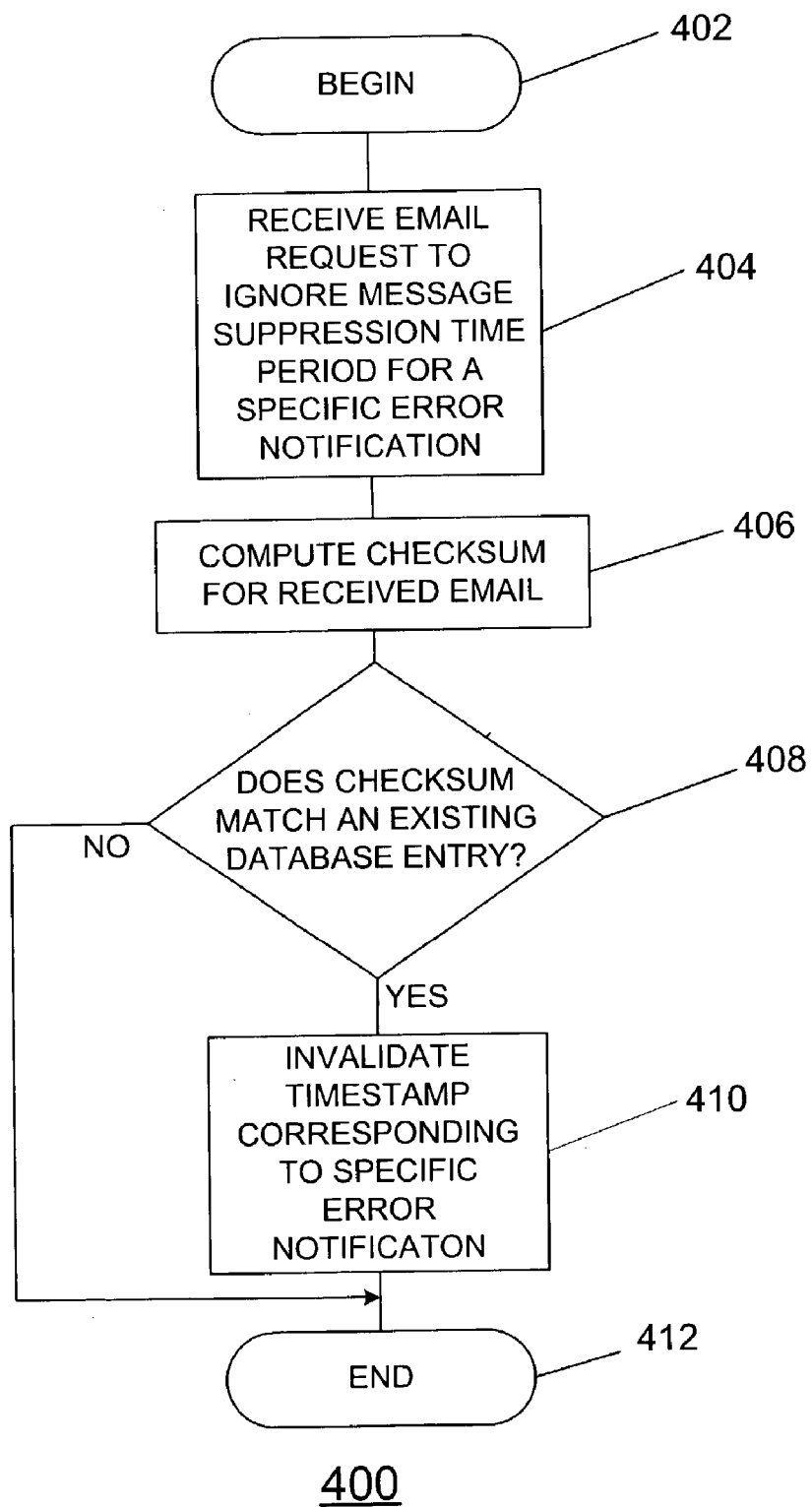
FIG. 5 is a process flow diagram that is useful in explaining the message suppression functionality in accordance with an embodiment of the present invention.

FIG. 5 is a process flow diagram that may be useful in explaining the message suppression functionality in accordance with an embodiment of the present invention. The process is generally referred to by the reference numeral 400. At block 402, the process begins. To cancel or ignore the message suppression time period for a particular failure notification or failure message, an IT support team member may send an email to a designated email address. The email may contain an error notification or error message for which the network support team member may desire to cancel the message suppression time period. Upon receipt of this message (block 404), the API 202 (FIG. 3) may compute the checksum associated with the error notification or error message (block 406). As an alternative, the email message may contain the checksum associated with the appropriate error notification or error message so that the API 202 (FIG. 3) may not have to compute the checksum.

At block 408, a comparison may be performed to determine if the checksum of the email message corresponds to a failure notification entry contained in the array 216 (FIG. 3). If no match is found, the email may be discarded and the process ends, as shown at block 412. If, however, the checksum of the received email corresponds to an entry in the array 216 (FIG. 3), then the timestamp of the corresponding array entry may be overwritten or invalidated, as shown at block 410. To invalidate the timestamp, the timestamp value stored in the array 216 (FIG. 3) may be set to the bogus initialization value (for example, negative one). In this manner, subsequent failure notifications that have the same checksum as the email will not be suppressed, but will be forwarded to IT support personnel for action. After the invalidation of the timestamp, the process ends (block 412).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for message suppression, the system comprising:
    a memory that is adapted to store a data element corresponding to a failure notification and to store a corresponding timestamp; and
    an interface adapted to:
    receive the failure notification;
    create the corresponding timestamp;
    store the data element and the timestamp corresponding to the failure notification in the memory;
    send a message corresponding to the failure notification;
    suppress the sending of subsequent messages corresponding to the failure notification until a predetermined condition occurs; and
    receive a notification to cancel the suppression of subsequent messages corresponding to the failure notification; and send subsequent messages corresponding to the failure notification in response to failure notifications received after the notification to cancel the suppression of subsequent messages.

2. The system set forth in claim 1, wherein the predetermined condition is the expiration of a predetermined time period.

3. The system set forth in claim 1, wherein the interface is an application program interface ("API").

4. The system set forth in claim 1, wherein the interface is adapted to invalidate the timestamp in response to the notification to cancel the suppression of subsequent messages corresponding to the failure notification.

5. The system set forth in claim 4, wherein the timestamp is invalidated by replacing the timestamp with a bogus value 6. The system set forth in claim 1, wherein the data element comprises a checksum.

7. The system set forth in claim 1, wherein the data element comprises a message digest.

8. The system set forth in claim 1, wherein the notification to cancel the suppression of subsequent messages corresponding to the failure notification is included in an email message delivered to the interface.

9. The system set forth in claim 1, comprising an email server that is adapted to be accessed by the interface.

10. The system set forth in claim 9, wherein the email server has a specific email address that is dedicated to receiving requests to cancel the suppression of subsequent messages corresponding to the failure notification 11. A computer network, comprising:
a plurality of computers, each of the plurality of computers being adapted to generate failure notifications;
a memory adapted to store a data element corresponding to a failure notification received from one of the plurality of computers and to store a corresponding timestamp; and
an interface that is adapted to:
receive the failure notification;
create the corresponding timestamp;
store the data element and the corresponding timestamp in the memory;
send a message corresponding to the failure notification;
suppress the sending of subsequent messages corresponding to the failure notification until a predetermined condition occurs; and
receive a notification to cancel the suppression of subsequent messages corresponding to the failure notification; and
send subsequent messages corresponding to the failure notification in response to failure notifications received after the notification to cancel the suppression of subsequent messages.

12. The computer network set forth in claim 11, wherein the predetermined condition is the expiration of a predetermined time period 13. The computer network set forth in claim 11, wherein the interface is an application program interface ("API").

14. The computer network set forth in claim 11, wherein the interface is adapted to invalidate the timestamp in response to the notification to cancel the suppression of subsequent messages corresponding to the failure notification.

15. The computer network set forth in claim 14, wherein the timestamp is invalidated by replacing the timestamp with a bogus value.

16. The computer network set forth in claim 11, wherein the data element comprises a checksum.

17. The computer network set forth in claim 11, wherein the data element comprises a message digest.

18. The computer network set forth in claim 11, wherein the notification to cancel the suppression of subsequent messages corresponding to the failure notification is included in an email message delivered to the interface.

19. The computer network set forth in claim 11, comprising an email server that is adapted to be accessed by the interface.

20. The computer network set forth in claim 19, wherein the email server has a specific email address that is dedicated to receiving requests to cancel the suppression of subsequent messages corresponding to the failure notification.

21. A method for suppressing error messages in a computer network, comprising:
receiving a failure notification;
creating a corresponding timestamp;
sending a message corresponding to the failure notification;
establishing a predetermined condition prior to which the sending of subsequent messages corresponding to the failure notification is suppressed;
receiving a notification to cancel the suppression of subsequent messages corresponding to the failure notification; and
sending subsequent messages corresponding to the failure notification in response to failure notifications received after the notification to cancel the suppression of subsequent messages corresponding to the failure notification.

22. The method set forth in claim 21, comprising storing the data element corresponding to the failure notification in association with the corresponding timestamp.

23. The method set forth in claim 21, comprising invalidating the timestamp in response to the notification to cancel the suppression of subsequent messages corresponding to the failure notification.

24. The method set forth in claim 21, comprising replacing the timestamp with a bogus value.

25. The method set forth in claim 21, comprising generating a checksum that corresponds to the failure notification.

26. The method set forth in claim 21, comprising generating a message digest that corresponds to the failure notification.

27. A system for message suppression, the system comprising:
means for storing a data element corresponding to a failure notification and
a corresponding timestamp; and
means for issuing a failure message corresponding to the failure notification and suppressing subsequent failure messages based on the failure notification; and
means for receiving an email notification to cancel the suppression of subsequent failure messages.

* * * * *

UNITED STATES PATENT AND TRADEMARK OFFICE
CERTIFICATE OF CORRECTION

PATENT NO. : 7,096,391 B2  Page 1 of 1
APPLICATION NO. : 10/425439
DATED : August 22, 2006
INVENTOR(S) : Ted C. Johnson It is certified that error appears in the above-identified patent and that said Letters Patent is hereby corrected as shown below:

In column 9, line 9, in Claim 3, delete "("API")" and insert -- ("API") --, therefor.

In column 9, line 15, in Claim 5, after "value" insert -- . --.

In column 9, line 29, in Claim 10, after "notification" insert -- . --.

In column 9, line 55, in Claim 12, after "period" insert -- . --.

In column 9, line 57, in Claim 13, delete "("API")" and insert -- ("API") --, therefor.

Signed and Sealed this

Fifth Day of May, 2009

JOHN DOLL
*Acting Director of the United States Patent and Trademark Office*